May 21, 1935.  M. W. McARDLE ET AL  2,001,793

SAFETY DEVICE FOR FOOD CHOPPERS AND THE LIKE

Filed May 10, 1933  2 Sheets—Sheet 1

Inventors
Michael W. McArdle
Ivar Jepsson
By Wilson, Dowell, McLanna & Wintercorn
Attys.

May 21, 1935.  M. W. McARDLE ET AL  2,001,793
SAFETY DEVICE FOR FOOD CHOPPERS AND THE LIKE
Filed May 10, 1933   2 Sheets-Sheet 2
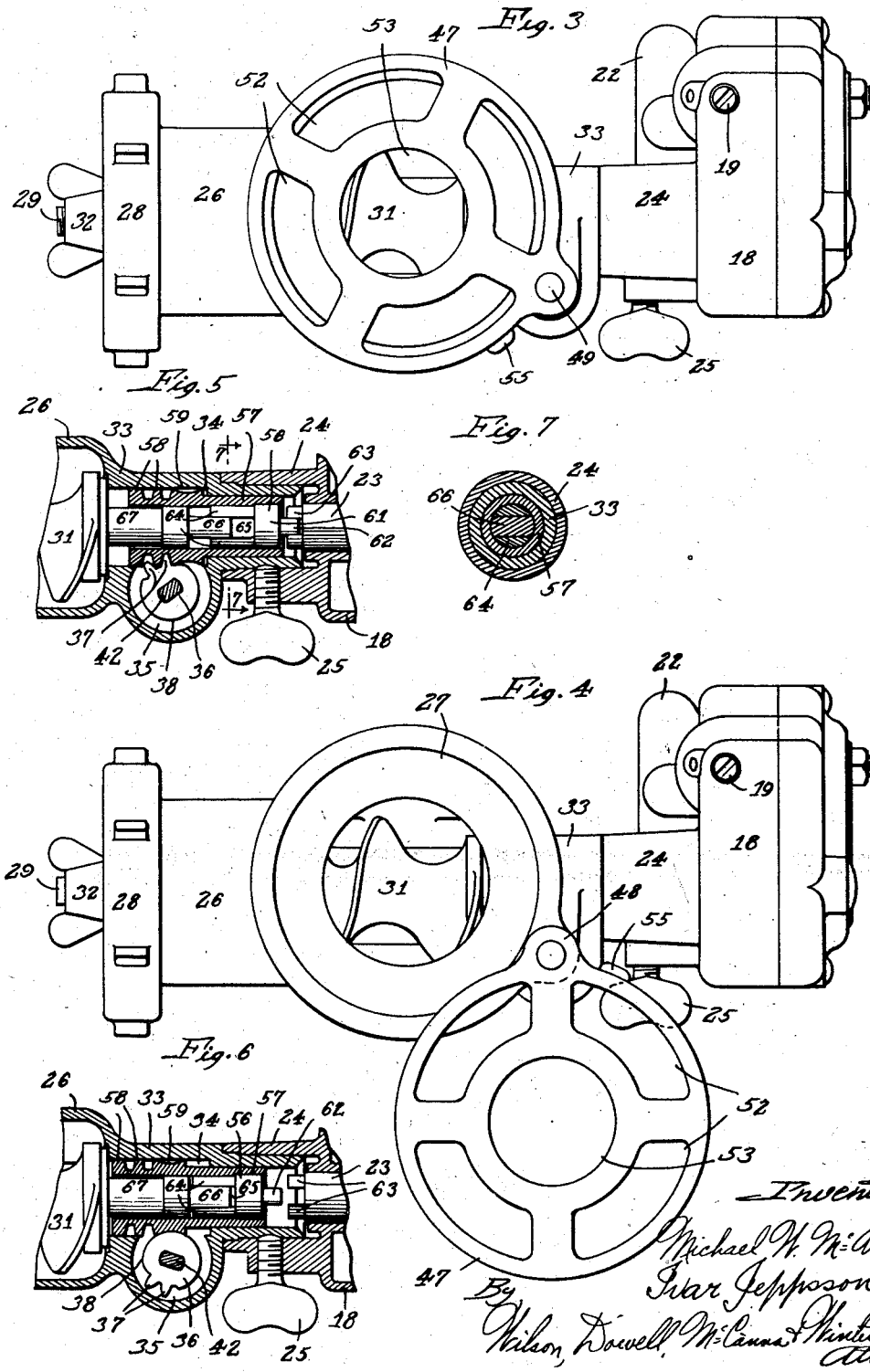

Patented May 21, 1935

2,001,793

UNITED STATES PATENT OFFICE 2,001,793

SAFETY DEVICE FOR FOOD CHOPPERS AND THE LIKE

Michael W. McArdle and Ivar Jeppsson, Chicago, Ill., assignors to Chicago Flexible Shaft Company, Chicago, Ill., a corporation of Illinois Application May 10, 1933, Serial No. 670,320

8 Claims. (Cl. 192—135)

This invention relates to safety devices for kitchen appliances and more particularly for appliances of the type having a food working means and a hopper for supplying food thereto and wherein there is danger of injury to the hands of the operator from contact with the food working means of the appliance. The invention contemplates means arranged to close the feed opening of the appliance during the cutting function and to disconnect the power when food is being supplied to the hopper whereby to prevent the fingers of the operator from being caught in the working mechanism.

The primary object of the invention is the provision of an improved safety device for kitchen appliances and the like.

We have also aimed to provide a safety device for food working attachments operable independently of the machine to which the attachment is connected.

Another object of the invention is the provision of an appliance having a hopper wherein the driven parts are automatically disconnected from the driving means when the supply of material in the hopper is being replenished.

A still further object of the invention is the provision of a kitchen appliance having a guard covering the feed opening, and clutch means in the driving train of the appliance actuated by movement of the guard to clutch and declutch the food working means.

Other objects and attendant advantages will become apparent to those skilled in the art from the following description and the accompanying drawings in which—

Fig. 3 is a top view of the food chopper and power transfer unit showing the guard covering the feed hopper;

Fig. 4 is a top view similar to Fig. 3 showing the guard in its moved position;

Fig. 5 is a section on the line 5—5 of Figure 1 showing the clutch mechanism parts occupying a position corresponding to the position of the guard shown in Fig. 3;

Fig. 6 is a section on the line 5—5 of Figure 1 showing the clutch mechanism in the position corresponding with Fig. 4, and Fig. 7 is a section on the line 7—7 of Fig. 5.

Figure 1:
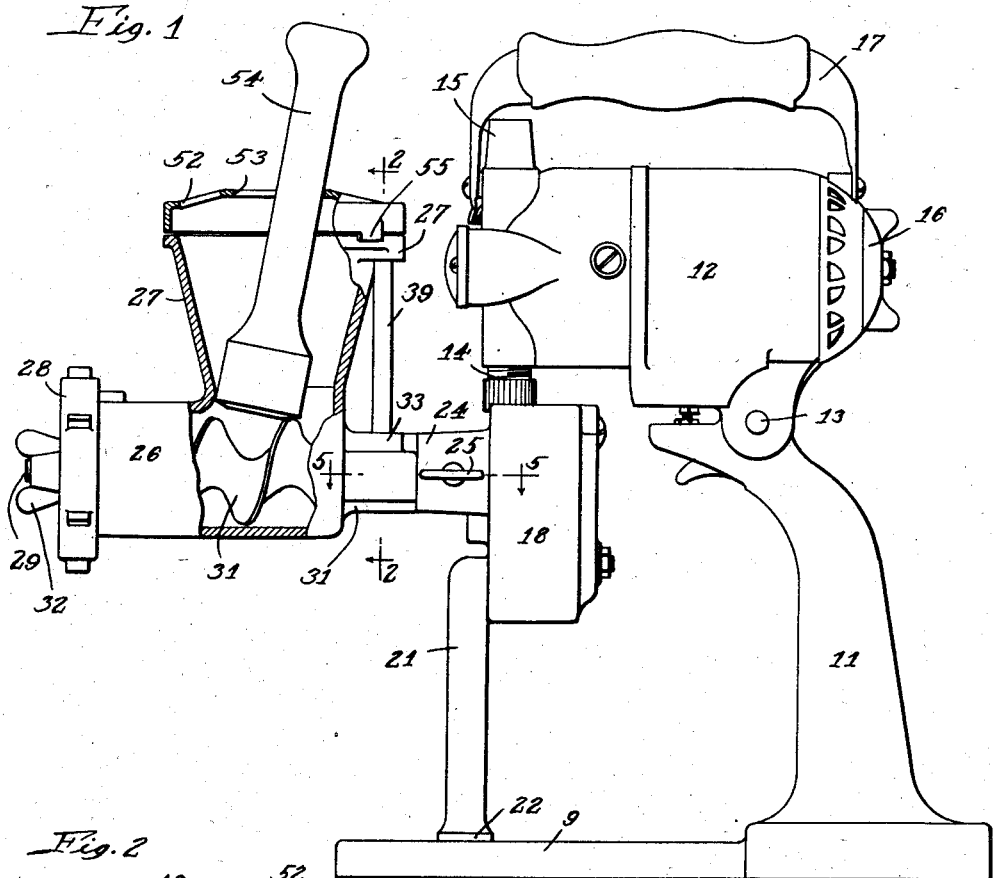
Figure 1 is a side elevation partly in section showing our invention as applied to a meat chopper attachment for power driven mixers.
Figure 2:
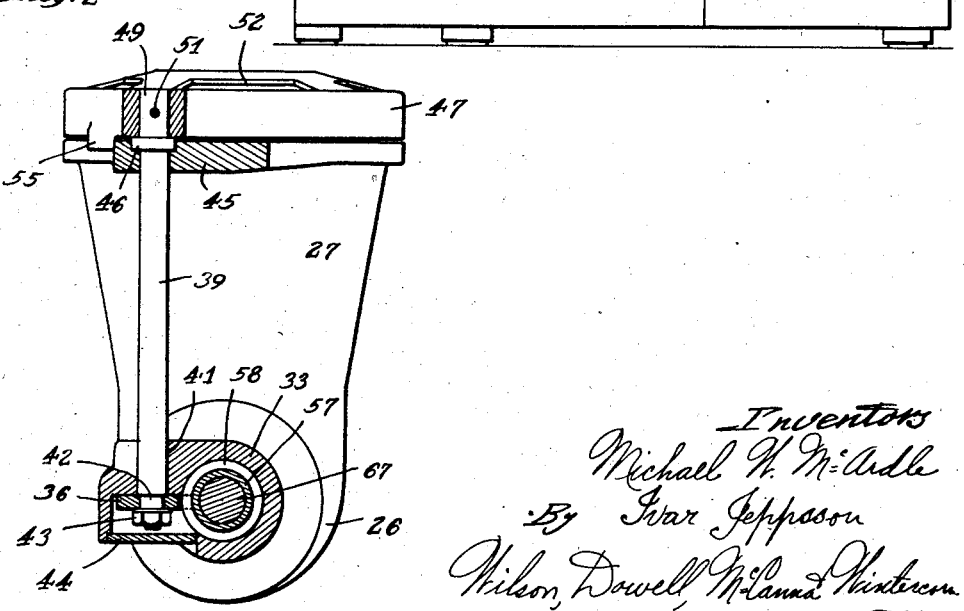
Fig. 2 is a section on the line 2—2 of Figure 1.

While the device is generally applicable to kitchen appliances having a food working means such as a food chopper, cutter, slicer, or the like, we have chosen for the purpose of illustration to show the invention as applied to a food chopper such as shown and described in the copending application of one of us, Serial No. 628,625, filed August 13, 1932.

As described in said application, the chopper is arranged to be driven from a mixer having a base 9 provided with a pedestal 11. A motor designated generally by the numeral 12 is pivoted to the pedestal, as shown at 13, and carries a pair of depending beater spindle sleeves 14 and an upper power outlet 15. Switch means 16 serve to control the speed of the motor and a handle 17 facilitates the handling of the motor. A power transfer unit designated generally by the numeral 18 having an upwardly extending spindle 19 extending into one of the beater spindle sleeves 14 is supported on the base 9 by a leg 21 having feet 22 at its lower end seating in openings in the base 9, not shown. The power transfer unit 18 carries gearing for converting the relatively high speed at the spindle 19 to relatively low speed on a shaft 23 extending through one side of the power transfer unit and having a boss 24 surrounding its projecting end for the purpose of receiving and supporting various attachments to be driven from the motor 12, the wing nut 25 serving to secure such attachments in the boss 24 in normal driving relation with the shaft 23.

The chopper consists of a body having a cylindrical portion 26 and a conical feed hopper 27. The hopper is preferably of a size to have substantially greater capacity than usual and is arranged to hold a quantity normally sufficient to meet the needs of the usual household so that it is normally only necessary to carry the safety device, presently to be described, through a single cycle of operations though they may be repeated as often as may be necessary if a greater amount of food is to be chopped. One end of the cylindrical portion 26 carries the usual cutter retaining ring 28 arranged to retain the usual cutter plates and to support the forward end 29 of a feed worm 31, a wing nut 32 serving to hold cutter elements on the feed screw 31. The opposite end of the cylindrical portion is provided with a neck designated generally by the numeral 33 receivable in the boss 24 and secured therein by means of the wing nut 25. The neck has a longitudinal opening 34 for the reception of driving and clutch members presently to be described and an offset opening 35 for the reception of a gear 36, the gear carrying teeth 37 and a dwell portion 38. A pin 39 is journaled in the neck, as shown at 41, and carries a rectangular lower end 42 which receives the gear 36, the latter being secured to the pin by means of a nut 43 threaded onto the lower end of the pin. The lower side of the opening 35 is closed by means of a plate 44 pressed into the opening. The pin 39 is journaled near its upper end in an ear 45 on the upper end of the hopper 27 and carries a collar 46 received in a countersink in the ear 45. The gear 36 and the collar 46 prevent longitudinal movement of the pin 39. A guard 47 carries an ear 48 which receives the upper end 49 of the pin 39 and is secured thereto by means of a lateral pin 51.

The guard 47 is given substantially the same peripheral shape as the upper end of the hopper 27 and has an upper face arranged to cover the entrance to the hopper 27. This face is provided with openings 52 for the purpose of permitting the operator to view the interior of the hopper and with a central opening 53 for the reception of a pestle 54 for use in manually urging the material from the hopper into the worm 31. The guard 47 is rotatable between the position shown in Fig. 3 wherein the top of the hopper 27 is covered, this position being determined by a finger 55 formed on the guard and arranged to contact the side of the hopper and the position shown in Fig. 4 in which the opening of the hopper is uncovered for the reception of material to be ground.

Rotation of the guard between the positions shown in Figs. 3 and 4 brings about rotation of the pin 39 and the gear 36, the gear 36 moving between the positions shown in Figs. 5 and 6. Such rotation brings about longitudinal movement of a clutch element 56 positioned in the longitudinal opening 34 in the neck 33. This clutch element consists of a sleeve 57 having a plurality of circumferential ribs 58 and a dwell surface 59. The ribs 58 act as gear teeth in the nature of a rack and are engaged or disengaged by the teeth 37 of the gear 36 to move the sleeve longitudinally in the opening 34 upon rotation of the gear. The dwell area 59 on the sleeve serves to cooperate with the dwell 38 on the gear to permit additional movement of the guard 47 when the teeth of the gear have become disengaged from the ribs 58 and further movement of the sleeve is not required, and also to lock the sleeve against longitudinal movement and accidental engagement. The opposite end of the sleeve 57 carries a clutch piece 61 which may advantageously be pressed into the end of the cylinder 57 and carries at its outer end a tongue 62 arranged to cooperate with projections 63 on the shaft 23 to form a tongue and groove driving connection between the shaft and the clutch member. The opposite end of the clutch member carries a pair of projections 64 forming a groove 65 adapted to receive a tongue 66 formed on the end of a journal 67 carried by the worm 31, the journal 67 supporting the rear end of the worm in the neck 33. The slot 65 and the tongue 66 are of such length that driving connection is always maintained between the clutch element 61 and the journal 67 regardless of the longitudinal position of the sleeve 57 and are so positioned that rotation of the gear 36 may cause longitudinal movement of the sleeve 57 of such length as to clutch and declutch the tongue 62 without disturbing the driving connection between the clutch member 61 and the journal 67.

In operation, the chopper is assembled as shown in Figure 1. The guard 47 is moved to the position shown in Fig. 4 and the hopper 27 filled with the material to be cut, such as meat or vegetables. It will be seen that at this point the motor 12 may be set into operation without driving the feed worm 31 since the clutch mechanism occupies the position shown in Fig. 6. When the guard 47 is rotated into the closed position shown in Fig. 3, the clutch mechanism moves into the position shown in Fig. 5, whereby the clutch is engaged and rotation of the worm 31 initiated. In this position, it will be seen that the guard is effective to prevent the operator from inserting the fingers into the worm. Pressure is applied to the material in the cone by means of the pestle 54 to facilitate the feeding of the material. When the supply of material in the hopper has reached a desired stage of exhaustion the pestle is removed and the guard is rotated to the open position shown in Fig. 4. Simultaneously, with such rotation the clutch element 56 is moved to the declutched position shown in Fig. 6 whereby rotation of the worm 31 ceases. In this position, the hopper is again recharged and swung to the closed position to again start the chopping operation. It should thus be plain that when the guard occupies the closed position it is impossible for the operator to insert the fingers into the operating parts of the machine, whereas when the guard is moved to the open position in which such insertion is possible the power is disconnected from the operating parts of the chopper so that the operator will not be injured even though the fingers are inserted into the worm.

Attention is directed to the fact that we have provided a unitary safety device, all of which is carried by the hopper attachment and no further operations are required in assembling the device over those normally required for placing the attachment upon the power transfer unit.

Attention is also directed to the fact that the safety device is positive in operation and is not dependent for its safety characteristics upon any factors foreign to the mechanism itself, such as the size of the hand of the operator or the operation of the driving motor. It will also be seen that in the use of this device the motor is in constant and uniform operation and it is not necessary to stop and start the motor in order to insure safety of operation.

It will further be observed that the speed of the chopping operations is not materially impaired by the use of this mechanism since the chopper is rapidly and automatically clutched and declutched by the mere swinging or rotation of the guard which may be accomplished by one hand of the operator while the other hand is being used to feed the material to be chopped.

While we have thus described and illustrated a specific embodiment of our invention, we are aware that numerous alterations and changes may be made therein without departing from the spirit of the invention and the scope of the appended claims, in which—

We claim:

1. In a kitchen appliance, the combination of food working means, a hopper adapted to continuously supply material to said means, continuously operating power means during the operation of the food working means for operating said food working means including clutch means for connecting and disconnecting the drive between the power means and food working means, a guard arranged in a closed position to cover the mouth of said hopper and prevent the operator extending his fingers through the hopper and into contact with said food working means, the guard being movable back and forth between said closed position and an open position, and means operated by the guard for engaging said clutch means when the guard is moved to its closed position and for disengaging said clutch means to temporarily disconnect the food working means from said continuously operating power means when moved to said open position.

2. The combination in a power driven kitchen appliance having a feed opening adapted for the continuous supply of material to the appliance during the operation thereof, of a safety device comprising a guard arranged to cover the feed opening of the appliance, and clutch means in the driving train for declutching the power supply in response to movement of the guard from the opening for the intermittent replenishment of material in the feed opening.

3. The combination in a kitchen appliance attachment of the type adapted to continuously receive material at one point and discharge the processed material at a different point, of a safety device comprising a guard movable between a closed position covering the feed opening of the appliance and an open position, continuously driven clutch means for driving the appliance, and means operated by movement of the guard for engaging and disengaging the clutch to disengage the clutch while the appliance is being fed.

4. The combination in a kitchen appliance attachment arranged to be driven from a continuously operating drive shaft, of a body having a feed hopper, a food working means in the body conveying material away from the hopper, the food working means being supported in coaxial alignment with the drive shaft, clutch means carried by the body movable to clutch said means to the drive shaft, a guard carried by the body movable to open and close the hopper, and means for disengaging and engaging said clutch means responsive to movement of the guard, to momentarily arrest motion of the food working means during replenishment of the supply in said hopper.

5. The combination in a kitchen appliance arranged to be driven from a drive shaft, of a body having a hopper, food working means in the body conveying material away from the hopper, said means being supported in coaxial alignment with the drive shaft, a cylindrical clutch element carried by the body movable to clutch said means to the drive shaft, said element having gear teeth on its outer surface, a guard movable to open and close the hopper, and means engaging said gear teeth responsive to movement of said guard to disengage and engage said clutch element.

6. The combination in a kitchen appliance attachment arranged to be driven from a drive shaft, of a food working element, a feed hopper for supplying material to said element, a clutch element between the drive shaft and the food working means, a gear for moving the clutch element into and out of engagement, a guard over said hopper rotatable to open and close the hopper, and a pin connecting said guard and said gear, the latter being rotatable with the guard to engage and disengage the clutch with closing and opening movement of the guard.

7. The combination in a kitchen appliance having food working means adapted to conduct material through the appliance, a continuously operating driving shaft therefor and a feed hopper of the kind for continuously supplying material to the food working means, a guard movable to cover said hopper, a clutch element on said means, said driving shaft and clutch element having a tongue and groove connection, and means responsive to movement of said guard for moving said clutch element to engage and disengage said connection, to intermittently stop the food working element to replenish the hopper.

8. The combination in a kitchen appliance having food working means, a driving shaft therefor and a feed hopper, a guard movable to cover said hopper, a cylindrical clutch element having a tongue at one end and a groove at the other, a tongue on the end of the worm for reception in the groove of said element, said driving shaft having a groove for the reception of the tongue on said element and said element being movable for engagement and disengagement of one of said tongues, and means responsive to movement of said guard for moving said element to engage and disengage said connection.

MICHAEL W. McARDLE.
IVAR JEPPSSON.